United States Patent
Rahman et al.

(10) Patent No.: US 9,461,738 B2
(45) Date of Patent: Oct. 4, 2016

(54) BURST MARKER SCHEME IN A COMMUNICATION SYSTEM

(71) Applicant: Futurewei Technologies, Inc., Plano, TX (US)

(72) Inventors: Syed Rahman, Santa Clara, CA (US); Dao Pan, Shenzhen (CN); Fanglin Sun, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 76 days.

(21) Appl. No.: 14/267,965

(22) Filed: May 2, 2014

(65) Prior Publication Data

US 2014/0328589 A1 Nov. 6, 2014

Related U.S. Application Data

(60) Provisional application No. 61/819,119, filed on May 3, 2013.

(51) Int. Cl.
*H04B 10/079* (2013.01)
*H04B 10/2575* (2013.01)
*H04L 5/00* (2006.01)
(Continued)

(52) U.S. Cl.
CPC .. *H04B 10/07955* (2013.01); *H04B 10/25753* (2013.01); *H04L 27/2613* (2013.01); *H04L 27/2647* (2013.01); *H04L 27/2656* (2013.01); *H04L 27/2675* (2013.01); *H04Q 11/0067* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 2006/0007849 A1* | 1/2006 | Kim | H04L 5/0037 370/208 |
| 2006/0029163 A1* | 2/2006 | Yang | H04L 27/22 375/340 |
| 2007/0110175 A1* | 5/2007 | Fechtel | H04L 27/2657 375/260 |

(Continued)

OTHER PUBLICATIONS

"IEEE Standard for Information Technology-Telecommunications and Information Exchange Between Systems—Local and Metropolitan Area Networks—Specific Requirements—Part 3: Carrier Sense Multiple Access with Collisiion Detection (CSMA/CD) Access Method and Physical Layer Specifications—Amendment: Media Access Control Parameters, Physical Layers, and Management Parameters for Subscriber Access Networks," IEEE Standard 802.3ah; Sep. 7, 2004, 640 pages.

(Continued)

*Primary Examiner* — David Payne
*Assistant Examiner* — Casey Kretzer
(74) *Attorney, Agent, or Firm* — Conley Rose, P.C.; Grant Rodolph; William H. Dietrich

(57) ABSTRACT

An apparatus comprising a receiver configured to couple to an Ethernet Passive Optical network over Coaxial (EPoC) network, and receive an upstream Orthogonal Frequency Division Multiplexing (OFDM) signal comprising a plurality of OFDM Resource Elements (REs), and a processor coupled to the receiver and configured to determine a presence of a burst marker sequence in the received signal, wherein the burst marker sequence comprises interlaced pilot symbols and null symbols, and wherein determining the presence of the burst marker sequence comprises computing a power ratio between a first set of the OFDM REs and a second set of the OFDM REs, and determining that the burst marker sequence is found when the computed power ratio exceeds a pre-determined threshold.

21 Claims, 8 Drawing Sheets

(51) Int. Cl.
*H04L 27/26* (2006.01)
*H04Q 11/00* (2006.01)

(56) References Cited

U.S. PATENT DOCUMENTS

| | | | | |
|---|---|---|---|---|
| 2010/0290557 | A1* | 11/2010 | Lee | H04L 27/262 375/295 |
| 2010/0316044 | A1* | 12/2010 | Vrcelj | H04L 5/0023 370/350 |
| 2011/0003598 | A1* | 1/2011 | Ma | H04W 72/0426 455/452.1 |
| 2011/0058813 | A1 | 3/2011 | Boyd et al. | |
| 2011/0150115 | A1* | 6/2011 | Schmidl | H04L 5/0048 375/260 |
| 2012/0226955 | A1* | 9/2012 | Norair | H04L 1/0061 714/752 |
| 2012/0269103 | A1* | 10/2012 | Papasakellariou | H04L 1/1614 370/280 |
| 2014/0255029 | A1* | 9/2014 | Varanese | H04L 27/2626 398/66 |

OTHER PUBLICATIONS

"Draft Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Physical Layer Specifications and Management Parameters for 10 Gb/s Passive Optical Networks," IEEE Draft P802.3av/D2.2, Dec. 3, 2008, 267 pages.

Montreuil, et al., "EPoC Burst Marker Proposal for EPoC 802.3bn," IEEE 802.3bn EPoC, Mar. 16-21, 2014, Beijing, China, 20 pages.

"Next Generation Ethernet Passive Optical Network (NG-EPON) Industry Connections Activity Initiation Document (ICAID)," Version: 1.93, IEEE Standards Association, Sep. 3, 2013, 6 pages.

"Series G: Transmission Systems and Media, Digital Systems and Networks—Digital Sections and Digital Line System—Optical Line Systems for Local and Access Networks—Broadband Optical Access Systems Based on Passive Optical Networks (PON)," International Telecommunication Union, Telecommunication Standardization Sector of ITU, G.983.1, Jan. 2005, 124 pages.

"Series G: Transmission Systems and Media, Digital Systems and Networks—Digital Sections and Digital Line System—Optical Line Systems for Local and Access Networks—Gigabit-Capable Passive Optical Networks (GPON): Physical Media Dependent (PMD) Layer Specification," International Telecommunication Union, Telecommunication Standardization Sector of ITU, G.984.2, Mar. 2003, 38 pages.

Foreign Communication From A Counterpart Application, PCT Application No. PCT/US2014/036480, International Search Report dated Sep. 5, 2014, 5 pages.

Foreign Communication From A Counterpart Application, PCT Application No. PCT/US2014/036480, Written Opinion dated Sep. 5, 2014, 6 pages.

Varanese, N., et al., "Burst Markers for EPoC Burst Mode," IEEE 802.3bn, Mar. 18-21, 2013, 34 pages.

Boyd, E., "EPOC Upstream Burst Markers," IEEE 802.3bn, Mar. 2013, 14 pages.

Kliger, A., et al., "EPoC Upstream Pilot Proposal," IEEE 802.3bn, Mar. 18-19, 2013, 9 pages.

Rahman, S., et al., "Update on Burst Marker Detection in EPoC," Huawei Technologies Co., LTD, Sep. 2013, 12 pages.

* cited by examiner

| Profile:1 | Profile:2 | Profile:3 | Profile:4 |
|---|---|---|---|
| 1 | 1 | -1 | 1 |
| -1 | 1 | -1 | -1 |
| 1 | -1 | -1 | -1 |
| -1 | -1 | -1 | 1 |
| -1 | -1 | 1 | 1 |
| -1 | 1 | 1 | 1 |
| 1 | 1 | 1 | 1 |
| -1 | -1 | -1 | -1 |
| 1 | 1 | 1 | -1 |
| 1 | 1 | -1 | 1 |
| 1 | -1 | 1 | -1 |
| 1 | -1 | -1 | 1 |
| 1 | 1 | -1 | -1 |
| 1 | -1 | -1 | -1 |
| -1 | -1 | 1 | 1 |
| 1 | -1 | -1 | 1 |
| -1 | -1 | 1 | -1 |
| 1 | -1 | 1 | -1 |
| 1 | 1 | -1 | -1 |
| 1 | -1 | -1 | -1 |
| 1 | 1 | 1 | 1 |
| -1 | -1 | 1 | 1 |
| 1 | -1 | -1 | 1 |
| -1 | -1 | 1 | -1 |
| 1 | -1 | 1 | -1 |
| 1 | 1 | 1 | 1 |
| -1 | -1 | -1 | 1 |
| 1 | 1 | 1 | 1 |
| -1 | -1 | -1 | 1 |
| 1 | -1 | -1 | 1 |
| 1 | 1 | 1 | 1 |
| -1 | -1 | -1 | -1 |
| 1 | -1 | -1 | -1 |
| 1 | 1 | 1 | -1 |
| 1 | -1 | 1 | 1 |
| -1 | 1 | 1 | 1 |
| 1 | 1 | 1 | 1 |
| -1 | -1 | -1 | -1 |
| -1 | -1 | -1 | -1 |
| 1 | 1 | 1 | 1 |
| 1 | 1 | 1 | -1 |
| -1 | -1 | 1 | 1 |
| 1 | 1 | 1 | 1 |
| -1 | -1 | -1 | -1 |
| 1 | 1 | 1 | -1 |
| -1 | -1 | 1 | -1 |
| 1 | -1 | -1 | -1 |
| 1 | -1 | -1 | -1 |
| -1 | 1 | -1 | 1 |
| -1 | 1 | -1 | -1 |
| 1 | -1 | -1 | 1 |
| -1 | 1 | 1 | 1 |
| 1 | -1 | -1 | -1 |
| -1 | 1 | -1 | 1 |
| 1 | -1 | 1 | 1 |
| -1 | 1 | -1 | 1 |
| 1 | 1 | -1 | 1 |
| 1 | -1 | 1 | 1 |
| -1 | 1 | 1 | -1 |
| 1 | -1 | -1 | -1 |
| -1 | -1 | -1 | -1 |

FIG. 5

BURST MARKER SCHEME IN A COMMUNICATION SYSTEM

CROSS-REFERENCE TO RELATED APPLICATIONS

The present application claims priority to U.S. Provisional Patent Application 61/819,119, filed May 3, 2013 by Syed Rahman, et al., and entitled "Burst Marker Scheme in a Communication System", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access to end users. PON may be a point-to-multipoint (P2MP) network with passive splitters positioned in an optical distribution network (ODN) to enable a single feeding fiber from a central office to serve multiple customer premises. PON may employ different wavelengths for upstream and downstream transmissions. Ethernet passive optical network (EPON) is a PON standard developed by the Institute of Electrical and Electronics Engineers (IEEE) and specified in IEEE documents 802.3ah and 802.3av, both of which are incorporated herein by reference. Hybrid access networks employing both EPON and other network types have attracted growing attention.

SUMMARY

In one embodiment, the disclosure includes an apparatus comprising a receiver configured to couple to an Ethernet Passive Optical network over Coaxial network (EPoC) network, and receive an upstream Orthogonal Frequency Division Multiplexing (OFDM) signal comprising a plurality of OFDM Resource Elements (REs), and a processor coupled to the receiver and configured to determine a presence of a burst marker sequence in the received signal, wherein the burst marker sequence comprises interlaced pilot symbols and null symbols, and wherein determining the presence of the burst marker sequence comprises computing a power ratio between a first set of the OFDM REs and a second set of the OFDM REs, and determining that the burst marker sequence is found when the computed power ratio exceeds a pre-determined threshold.

In another embodiment, the disclosure includes an apparatus comprising a processor configured to generate a burst marker sequence comprising a plurality of pilot symbols and a plurality of null symbols, wherein the plurality of pilot symbols and the plurality of null symbols are mapped onto a plurality of OFDM REs according to a pre-determined pattern, and a transmitter coupled to the processor and configured to couple to an EPoC network, and transmit the burst marker sequence to indicate an upstream data burst boundary.

In yet another embodiment, the disclosure includes a method comprising generating a burst marker sequence comprising a plurality of burst marker elements, mapping each burst marker element onto one OFDM RE, wherein the burst marker sequence is mapped across a time domain and then across a frequency domain, and transmitting the burst marker sequence to indicate a data burst and a bit loading profile for the data burst.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a table of an embodiment of four binary burst marker sequences.

DETAILED DESCRIPTION

Figure 1:
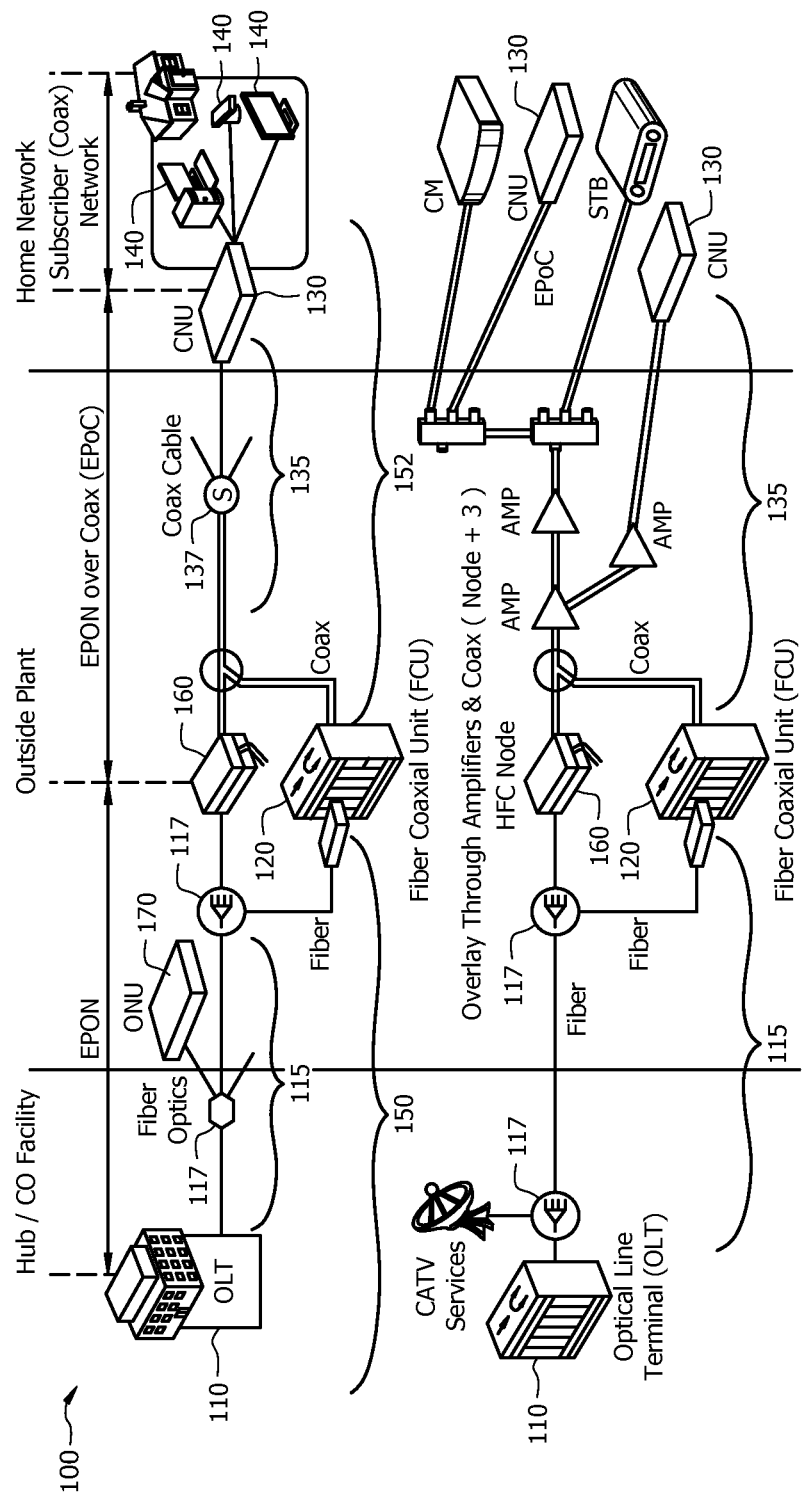
FIG. 1 is a schematic diagram of an embodiment of a unified optical-coaxial network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some hybrid access networks may combine optical networks with coaxial (coax) networks. Ethernet over Coax (EoC) may be a generic name used to describe all technologies that transmit Ethernet frames over a coaxial network. Examples of EoC technologies may include EPoC, Data Over Cable Service Interface Specification (DOCSIS), multimedia over coax alliance (MoCA), G.hn (a common name for a home network technology family of standards developed under the International Telecommunication Union (ITU) and promoted by the HomeGrid Forum), home phoneline networking alliance (HPNA), and home plug audio/visual (A/V). EoC technologies may have been adapted to run outdoor coax access from an Optical Network Unit (ONU) to an EoC head end with connected customer premises equipment (CPEs) located in subscriber homes. In a coaxial network, physical layer transmission may employ OFDM to encode digital data onto multiple carrier frequencies. Some advantages of OFDM transmission may include high spectral efficiency and robust transmission (e.g. attenuation at high frequencies in long coaxial wires, narrow band interferers, frequency selective noise, etc.).

An EPoC system may be a hybrid access network employing both optical and coaxial technologies. The EPoC may comprise an optical segment that may comprise a PON, and a coaxial segment that may comprise a coaxial cable network. In the PON segment, an Optical Line Terminal (OLT) may be positioned in a local exchange or central office where the OLT may connect the EPoC access network to an Internet Protocol (IP), Synchronous Optical Network (SONET), and/or Asynchronous Transfer Mode (ATM) backbone. In the coaxial segment, Coaxial Network Units (CNUs) may be positioned at end-user locations, and each CNU may serve a plurality (e.g. three to four) of end users which may be known as subscribers. A Fiber Coaxial Unit (FCU) may merge the interface between the PON segment and the coaxial segment of the network. The FCU may be a single box unit that may be located where an ONU and a Coaxial Line Terminal (CLT) are fused together, for example, at a curb or at a basement of an apartment building. The FCU may employ OFDM transmission at a physical layer to communicate with the CNUs. Some OFDM communication systems may employ media access plans (MAPs) to indicate locations of data bursts in data frames. However, MAPs may not be suitable for EPoC systems.

Disclosed herein is a burst marker scheme for indicating and/or detecting upstream data burst boundary and burst profiles in an EPoC network between CNUs and FCUs. In an EPoC network, an upstream data frame may carry multiple upstream data bursts, which may be transmitted from one or more CNUs. In order to differentiate one data burst from another, a transmitter may insert burst marker sequence at the boundary (e.g. at the start or at the end) of the data bursts. Burst marker sequences may be specially designed sequences and may comprise pre-determined data patterns such that a receiver may detect and/or search for the known patterns. In an embodiment, a burst marker sequence may comprise interlaced pilot symbols and null symbols, where pilot symbols may be Binary Phase Shift Keying (BPSK) modulated symbols (e.g. values of +1 and −1) and null symbols may be frequency nulls (e.g. values of zeros) and may comprise zero transmission energy. The pilot symbols and the null symbols may be interlaced in various patterns. For example, one interlaced pattern may be employed for indicating the start of an upstream data burst, while another interlaced pattern may be employed for indicating the end of an upstream data burst. Alternatively, different interlaced patterns may be employed for indicating different burst profiles (e.g. bit loading profiles). A transmitter may transmit one pilot symbol or one null symbol in one OFDM RE. In an embodiment, a receiver may determine the presence of a particular burst marker sequence in a received OFDM signal by computing a power ratio between a first set of OFDM REs and a second set of OFDM REs that correspond to pilot symbols and null symbols of a known burst marker sequence interlaced pattern. The disclosed power based burst marker detection scheme may reduce net burst loss rate when compared to a correlation based detection scheme.

FIG. 1 is a schematic diagram of an embodiment of a unified optical-coaxial network 100 comprising an optical portion 150 and a coaxial (electrical) portion 152. The network 100 may include an OLT 110, at least one CNU 130 coupled to a plurality of subscriber devices 140, and an FCU 120 positioned between the OLT 110 and the CNU 130, e.g., between the optical portion 150 and the coaxial portion 152.

The OLT 110 may be coupled via an ODN 115 to the FCUs 120, and optionally to one or more ONUs 170, or one or more Hybrid Fiber Coaxial (HFC) nodes 160 in the optical portion 150. The ODN 115 may comprise fiber optics and an optical splitter 117 and/or a cascade of 1×M passive optical splitters that couple OLT 110 to the FCU 120 and any ONUs 170. The value of M in EPoC, e.g., the number of FCUs, may for example be 4, 8, 16, or other values and may be selected by the operator depending on factors such as optical power budget. The FCU 120 may be coupled to the CNUs 130 via an electrical distribution network (EDN) 135, which may comprise a cable splitter 137, a cascade of taps/splitters, and/or one or more amplifiers. Each OLT 110 port may serve 32, 64, 128 or 256 CNUs 130. It should be noted that the upstream transmissions from CNUs 130 may reach the FCU 120 and not the other CNUs 130 due to a directional property of the tap. The distances between the OLT 110 and the ONUs 170 and/or FCUs 120 may range from about 10 to about 20 kilometers (km), and the distances between the FCU 120 and CNUs 130 may range from about 100 to about 500 meters (m). The network 100 may comprise any number of HFCs 160, FCUs 120 and corresponding CNUs 130. The components of network 100 may be arranged as shown in FIG. 1 or any other suitable arrangement.

The optical portion 150 of the network 100 may be similar to a PON in that the optical portion 150 may be a communications network that does not require active components to distribute data between the OLT 110 and the FCU 120. Instead, the optical portion 150 may use the passive optical components in the ODN 115 to distribute data between the OLT 110 and the FCU 120. Examples of suitable protocols that may be implemented in the optical portion 150 may include asynchronous transfer mode PON (APON) or broadband PON (BPON) defined by the ITU Telecommunication Standardization Sector (ITU-T) document G.983, Gigabit PON (GPON) defined by ITU-T document G.984, the EPON defined by IEEE documents 802.3ah and 802.3av, all of which are incorporated by reference as if reproduced in their entirety, the wavelength division multiplexing (WDM) PON (WDM-PON), and the Next Generation EPON (NGE-PON) in development by IEEE.

The OLT 110 may be any device configured to communicate with the CNUs 130 via the FCU 120. The OLT 110 may act as an intermediary between the FCUs 120 and/or CNUs 130 and another backbone network (e.g. the Internet). The OLT 110 may forward data received from a backbone network to the FCUs 120 and/or CNUs 130 and forward data received from the FCUs 120 or CNUs 130 onto the backbone network. Although the specific configuration of the OLT 110 may vary depending on the type of optical protocol implemented in the optical portion 150, in an embodiment, OLT 110 may comprise an optical transmitter and an optical receiver. When the backbone network employs a network protocol that is different from the protocol used in the optical portion 150, OLT 110 may comprise a converter that may convert the backbone network protocol into the protocol of the optical portion 150. The OLT converter may also convert the optical portion 150 protocol into the backbone network protocol.

The ODN 115 may be a data distribution system that may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the FCU 120. It should be noted that the optical fiber cables may be replaced by any optical transmission media in some embodiments. In some embodiments, the ODN 115 may comprise one or more optical amplifiers. In some embodiments, data distributed across the ODN may be combined with cable television (CATV) services using multiplexing schemes. The ODN 115 may extend from the OLT 110 to the FCU 120 and any optional ONUs 170 in a branching configuration as shown in FIG. 1, but may be alternatively configured as determined by a person of ordinary skill in the art.

The FCU 120 may be any device or component configured to forward downstream data from the OLT 110 to the corresponding CNUs 130 and forward upstream data from the CNUs 130 to the OLT 110. The FCU 120 may convert the downstream and upstream data appropriately to transfer the data between the optical portion 150 and the coaxial portion 152. The data transferred over the ODN 115 may be transmitted and/or received in the form of optical signals, and the data transferred over the EDN 135 may be transmitted and/or received in the form of electrical signals that may have the same or different logical structure as compared with the optical signals. As such, the FCU 120 may encapsulate or frame the data in the optical portion 150 and the coaxial portion 152 differently. In an embodiment, the FCU 120 may include a Media Access Control (MAC) layer and physical (PHY) layers, corresponding to the type of signals carried over the respective media. The MAC layer may provide addressing and channel access control services to the PHY layers. As such, the PHY may comprise an optical PHY and a coaxial PHY. In many embodiments, the FCU 120 may be transparent to the CNU 130 and OLT 110 in that the frames sent from the OLT 110 to the CNU 130 may be directly addressed to the CNU 130 (e.g. in the destination address), and vice-versa. As such, the FCU 120 may intermediate between network portions, namely an optical portion 150 and a coaxial portion 152 in the example of FIG. 1.

The ONUs 170 may be any devices that are configured to communicate with the OLT 110 and may terminate the optical portion 150 of the network. The ONUs 170 may present customer service interfaces to end users. In some embodiments, an ONU 170 may merge with a FCU 120 to form a FCU.

The electrical portion 152 of the network 100 may be similar to any known electrical communication system. The electrical portion 152 may not require any active components to distribute data between the FCU 120 and the CNU 130. Instead, the electrical portion 152 may use the passive electrical components in the electrical portion 152 to distribute data between the FCU 120 and the CNUs 130. Alternatively, the electrical portion 152 may use some active components, such as amplifiers. Examples of suitable protocols that may be implemented in the electrical portion 152 include MoCA, G.hn, HPNA, and Home Plug A/V.

The EDN 135 may be a data distribution system that may comprise electrical cables (e.g. coaxial cables, twisted wires, etc.), couplers, splitters, distributors, and/or other equipment. In an embodiment, the electrical cables, couplers, splitters, distributors, and/or other equipment may be passive electrical components. Specifically, the electrical cables, couplers, splitters, distributors, and/or other equipment may be components that do not require any power to distribute data signals between the FCU 120 and the CNU 130. It should be noted that the electrical cables may be replaced by any electrical transmission media in some embodiments. In some embodiments, the EDN 135 may comprise one or more electrical amplifiers. The EDN 135 may extend from the FCU 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, the FCU 120, and any subscriber devices 140. The CNUs 130 may act as intermediaries between the FCU 120 and the subscriber devices 140. For instance, the CNUs 130 may forward data received from the FCU 120 to the subscriber devices 140, and may forward data received from the subscriber devices 140 toward the OLT 110. Although the specific configuration of the CNUs 130 may vary depending on the type of network 100, in an embodiment, the CNUs 130 may comprise an electrical transmitter configured to send electrical signals to the FCU 120 and an electrical receiver configured to receive electrical signals from the FCU 120. Additionally, the CNUs 130 may comprise a converter that may convert FCU 120 electrical signals into electrical signals for the subscriber devices 140, such as signals in IEEE 802.11 wireless local area network (WiFi) protocol. The CNUs 130 may further comprise a second transmitter and/or receiver that may send and/or receive the converted electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscribed devices 140 may include desktop computers, laptop computers, tablets, mobile telephones, residential gateways, televisions, set-top boxes, and similar devices.

In an embodiment, a CNU 130 may transmit upstream data to an OLT 110 via an FCU 120. The transmission in the coaxial portion 152 of the network 100 between the CNU 130 and the FCU 120 may employ OFDM transmission. In an OFDM system, data may be transmitted in terms of OFDM frames that span across a time domain and a frequency domain. An OFDM frame may comprise a plurality of OFDM symbols in the time domain and each OFDM symbol may comprise a plurality of OFDM sub-carriers in the frequency domain. The number of OFDM symbols per OFDM frame and the time duration for each OFDM symbol may be pre-determined, for example, defined by a standard, and/or configured during deployment. Similarly, the number of sub-carriers per OFDM symbol and the sub-carrier spacing may also be standard defined parameters and/or configuration parameters. The smallest unit for OFDM transmission may be one time-frequency slot (e.g. one OFDM sub-carrier for a duration of an OFDM symbol), which may be referred to as an OFDM RE. In some embodiments, a plurality of OFDM REs that are contiguous in time and contiguous in frequency may be grouped together and may be referred to as an OFDM resource block. In such embodiments, resource allocations may be in units of OFDM resource blocks. A CNU 130 may transmit an upstream data packet to an FCU 120 in terms of an OFDM data burst by mapping the data bits (e.g. according to some modulation schemes) of the upstream data packet onto a plurality of the OFDM REs. It should be noted that an OFDM data burst may span one or more OFDM resource blocks depending on the size of the OFDM resource block, as well as the size of a data packet. The mapping of the data bits (e.g. bit loadings) may vary depending on sub-channel (e.g. frequency sub-carrier) conditions, for example, a high SNR sub-channel may support a higher number of data bits and a low SNR sub-channel may support fewer data bits to achieve a substantially low bit error rate or packet loss rate.

Figure 2:
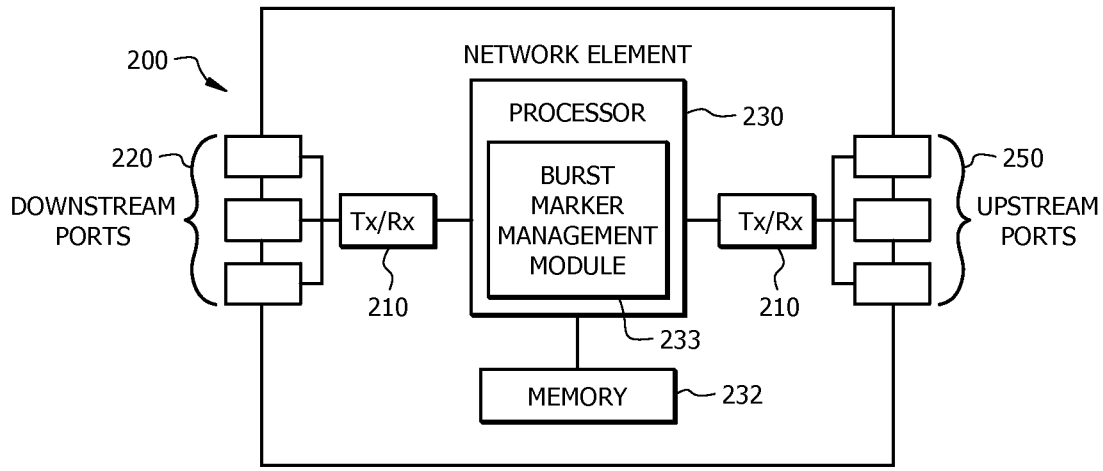
FIG. 2 is a schematic diagram of an embodiment of a network element (NE), which may act as a node in an EPoC network.

FIG. 2 is a schematic diagram of an example embodiment of an NE 200, which may act as a FCU (e.g. FCU 120) or a CNU (e.g. CNU 130) by implementing any of the schemes described herein. In some embodiments, NE 200 may also act as other node(s) in a network (e.g. network 100), such as a media converter unit that may be coupled to an optical access network and an electrical network (e.g. coaxial, any Digital Subscriber Line (xDSL), powerline, etc.) that employs OFDM transmission. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. Moreover, the terms network "element," "node," "component," "module," and/or other similar terms may be interchangeably used to generally describe a network device and do not have a particular or special meaning unless otherwise specifically state and/or claimed within the disclosure. At least some of the features/methods described in the disclosure may be implemented in a network apparatus or component such as an NE 200. For instance, the features/methods in the disclosure may be implemented using hardware, firmware, and/or software installed to run on hardware.

As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes, and a Tx/Rx 210 may be coupled to a plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise a burst marker management module 233, which may implement burst marker mapping method 700 and/or a burst marker detection method 800 as discussed in more detail below. In an alternative embodiment, the burst marker management module 233 may be implemented as instructions stored in the memory devices 232, which may be executed by processor 230. The memory device 232 may comprise a cache for temporarily storing content, e.g., a Random Access Memory (RAM). Additionally, the memory device 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

In an embodiment of an EPoC network (e.g. network 100), an upstream data frame transmitted in the coaxial portion (e.g. portion 152) of the network may comprise one or more data bursts. The data bursts may be separated by burst marker sequences, for example, at the beginning of each data burst and/or at the end of each data burst. Burst marker sequences may be specially designed sequences and may comprise pre-determined data patterns such that a receiver may detect and/or search for the known patterns. For example, a burst marker sequence may comprise a plurality of pilot symbols and a plurality of null symbols that are interlaced according to a pre-determined pattern. The pilot symbols may correspond to BPSK modulated symbols (e.g. values of +1 and/or −1). The null symbols may correspond to frequency nulls (e.g. values of zeros) and may comprise zero transmission energy. Each pilot symbol and/or each null symbol may be carried in one OFDM RE.

A burst marker sequence may be generated by interlacing pilot symbols and null symbols in various patterns. For example, one interlaced pattern may be employed for indicating the start of an upstream data burst, while another interlaced pattern may be employed for indicating the end of an upstream data burst. Alternatively, different interlaced patterns may be employed for indicating different burst profiles (e.g. bit loading profiles) pattern. As such, a burst marker sequence may indicate the boundary (e.g. begin and/or end) of a data burst as well as the burst profile for the data burst. Thus, a network may employ N (e.g. about four) different burst marker sequences (e.g. with N different interlaced patterns) to indicate N different burst profiles. The characteristics of a burst profile may be negotiated prior to data transmissions (e.g. during registration and/or negotiation), pre-configured during network deployment, and/or pre-determined as defined by a standard. In an embodiment, a burst profile may include a bit loading profile, which may indicate the number of bits per frequency sub-channel.

In an embodiment, a receiver may employ a power based detection method to determine the presence of a burst marker sequence in a received signal. As described herein above, pilot symbols may correspond to BPSK modulated symbols (e.g. values of +1 and −1) and null symbols may correspond to frequency nulls (e.g. values of zeros). As such, the power of the pilot symbols may be determined by the transmit power at a transmitter and the power of the null symbols may be determined by the noise floor. For example, when a communication channel comprises an SNR of X decibel (dB), the power of the pilot symbols may be about X dB higher than the power of the null symbols at a receiver. Thus, the difference in power levels between the pilot symbols and the null symbols may be employed by the receiver to detect the presence of a burst marker sequence. When multiple interlaced patterns are employed to indicate different burst profiles, a receiver may identify the particular burst marker sequence that passes the detection, and thus may determine a corresponding burst profile. In some embodiments, power boosting may be applied to burst marker sequences during transmission, which may improve burst detection rate. For example, a burst marker sequence (e.g. pilot symbols) may be transmitted at a higher power (e.g. zero, three, or six dBs) than the average power of a data burst (e.g. data symbols).

Figure 3:
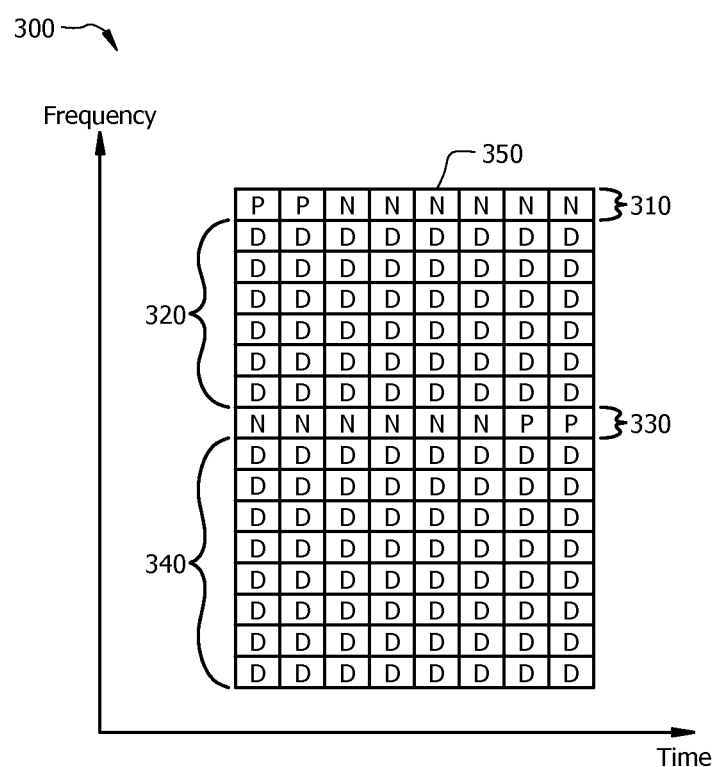
FIG. 3 illustrates an embodiment of a burst marker scheme.

FIG. 3 illustrates an embodiment of a burst marker scheme 300, which may be employed between an FCU and a CNU, such as FCU 120 and CNU 130. In scheme 300, the x-axis may represent time in units of OFDM symbols (e.g. each column) and the y-axis may represent frequency in units of OFDM sub-carriers (e.g. each row). Each time-frequency slot may represent an OFDM RE. In scheme 300, an OFDM frame 350 may comprise a first data burst 320, a second data burst 340, a first burst marker sequence 310, and a second burst marker sequence 330. The first burst marker sequence 310 may indicate the beginning of the first data burst 320. The second burst marker sequence 330 may indicate the beginning of the second data burst 340. Each data burst 320 and/or 340 may comprise a plurality of data symbols (e.g. depicted as D in OFDM frame 350) that span a plurality of contiguous OFDM symbols in time and a plurality of contiguous OFDM sub-carriers in frequency. Each burst marker sequence 310 and/or 330 may comprise a plurality of pilot symbols (e.g. depicted as P in OFDM frame 350) and a plurality of null symbols (e.g. depicted as N in OFDM frame 350) that span across a plurality of contiguous OFDM REs in time and across sub-carrier frequency. The first burst marker sequence 310 may comprise a different interlaced pattern from the second burst marker sequence 330. For example, the interlaced pattern in the first burst marker sequence 310 may indicate that the data burst 320 is transmitted according to a first burst profile A and the interlaced pattern in the second burst marker sequence 330 may indicate that the data burst 340 is transmitted according to a second burst profile B.

In some embodiments, resources may be allocated in units of OFDM resource blocks. Thus, a new burst marker sequence and/or a new data burst may start at the beginning of an OFDM resource block (e.g. six consecutive rows in OFDM frame 350) rather than continue from a previous data burst. In such embodiments, a receiver may search for the presence of a burst marker sequence at the beginning of OFDM resource blocks instead of performing a continuous search, and thus may allow more efficient usage of receiver computational resources. It should be noted that the interlaced patterns, the number of pilot symbols versus the number of null symbols in a burst marker sequence, and/or the beginning position of a burst maker sequence may be alternatively configured as determined by a person of ordinary skill in the art to achieve the same functionalities.

Figure 4:
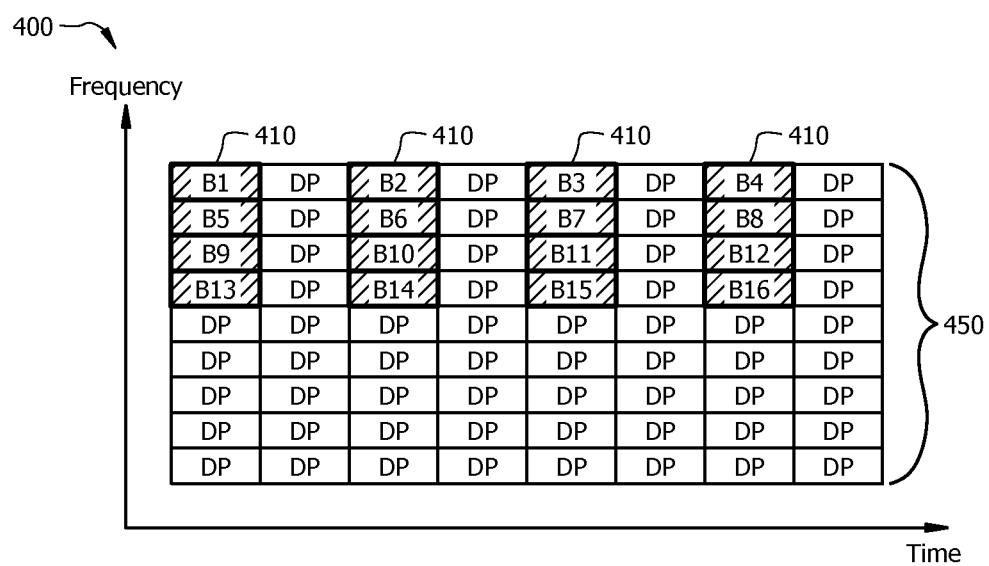
FIG. 4 illustrates another embodiment of a burst marker scheme.

FIG. 4 illustrates another embodiment of a burst marker scheme 400, which may be employed between an FCU and a CNU, such as FCU 120 and CNU 130. In scheme 400, the x-axis may represent time in units of OFDM symbols and the y-axis may represent frequency in units of OFDM sub-carriers. Each time-frequency slot may represent an OFDM RE. In scheme 400, an OFDM frame 450 may comprise a burst marker sequence 410 comprising a plurality of burst marker symbols (e.g. depicted as B1 to B16) comprising pilot symbols (e.g. BPSK modulated symbols) and/or null symbols. In OFDM frame 450, the burst marker sequence 410 may be interleaved with a plurality of data symbols and/or pilot symbols (e.g. depicted as DP). For example, the burst marker symbols B1 to B16 may be mapped to alternating OFDM REs. It should be noted that the pilot symbols marked as DP may refer to a different set of pilot symbols compared to the burst marker pilot symbols and may be employed for other functions, such as timing and/or frequency tracking and/or channel estimation. The interleaving of the burst marker sequence 410 and data and/or pilot symbols DP and the spreading of the burst marker sequence 410 over multiple frequency sub-carriers may provide some immunity for the burst marker sequence against narrow band ingress.

In some embodiments, a burst marker sequence (e.g. burst marker sequence 410) may be first mapped across time starting from the earliest transmission time of an OFDM frame (e.g. left to right in OFDM frame 450) and then mapped across frequency starting from a highest frequency (e.g. top to bottom in OFDM frame 450). However, it should be noted that the mapping of the burst marker sequence, the direction of the mapping, and/or the length (e.g. number of burst marker symbols) of the burst marker sequence may be alternatively configured as determined by a person of ordinary skill in the art to achieve the same functionalities.

In an embodiment, a burst marker sequence may be generated from a gold sequence generator. A gold sequence generator may employ two pseudo noise (PN) generators to generate a pair of preferred sequences (e.g. PN sequences) and an exclusive-or (XOR) operator to perform XOR operations between the pair of preferred sequences according to a gold sequence generator index to produce an output sequence. For example, a pair of preferred polynomials may be generated from a first PN generator polynomial and a second PN generator polynomial as shown below:

First generator polynomial: $Z^7+Z^3+1$

Second generator polynomial: $Z^7+Z^3+Z^2+Z+1$ where the first PN generator and the second PN generator may be configured with initial states of [0 0 0 0 0 0 1] (e.g. at least one shift register may be initialized to a binary value of one).

FIG. 5 is a table 500 of an embodiment of four binary (e.g. two states) gold sequences 510, 520, 530, and 540 with lengths of 64 generated from a gold sequence generator substantially similar to the gold sequence generator described herein above. For example, gold sequence indices of five, six, seven, and eight may be employed to generate sequences 510, 520, 530, and 540, respectively. The sequences 510, 520, 530, and 540 may be employed for indicating burst profiles 1, 2, 3, and 4, respectively. The sequences 510, 520, 530, and 540 may be employed in burst marker schemes 300 and/or 400.

Figure 6:
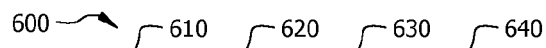
FIG. 6 is a table of an embodiment of four ternary burst marker sequences.

FIG. 6 is a table 600 of an embodiment of four ternary (e.g. three states) gold sequences 610, 620, 630, and 640, which may be obtained from the first 48 entries of the gold sequences 510, 520, 530, and 540, respectively, with zero insertions. It should be noted that zero values may be inserted between any burst marker elements and a zero insertion may shift the successive burst marker element by one entry. The sequences 610, 620, 630, and 640 may be employed for indicating burst profiles 1, 2, 3, and 4, respectively. It should be noted that when the length L of a burst marker sequence is shorter than the pre-generated gold sequences (e.g. with lengths of 64), a burst marker sequence with length L may be composed from the first L entries (e.g. starting from the top) of the pre-generated gold sequences. The sequences 610, 620, 630, and 640 may be employed in burst marker schemes 300 and/or 400.

Figure 7:
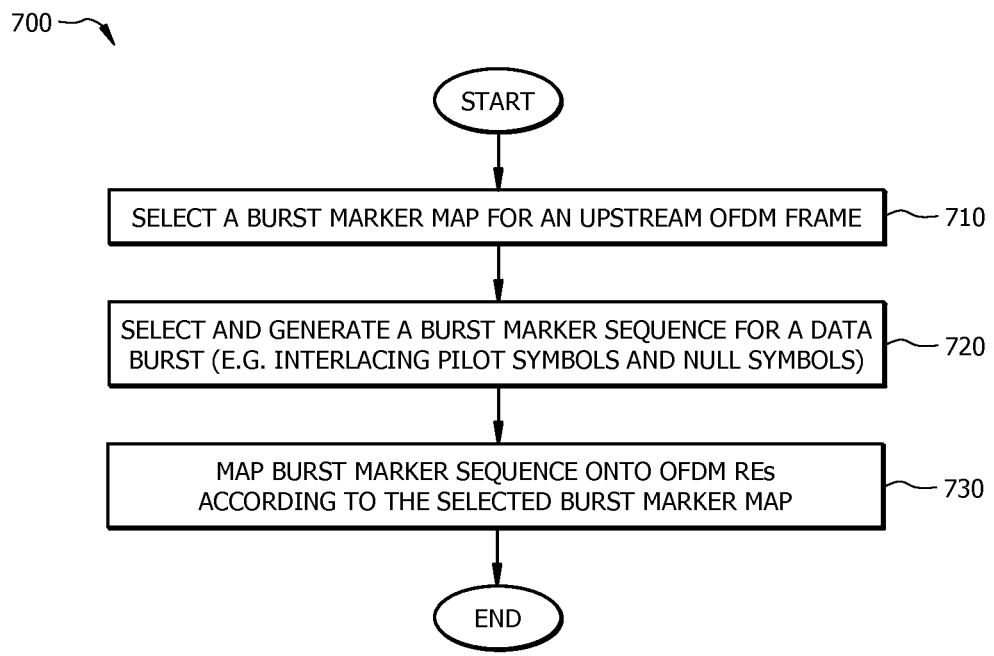
FIG. 7 is a flowchart of an embodiment of a burst marker mapping method.

FIG. 7 is a flowchart of an embodiment of a burst marker mapping method 700, which may be implemented by a CNU (e.g. CNU 130) in a coaxial network (e.g. portion 152 of network 100) during upstream transmissions. Method 700 may begin with selecting a burst marker map for an upstream OFDM frame at step 710. For example, a burst marker sequence may be mapped to contiguous OFDM REs across time and across frequency (e.g. scheme 300), alternating OFDM REs across time and across frequency (e.g. scheme 400), and/or any other suitable mapping for separating data bursts as would be appreciated by one of ordinary skill in the art. It should be noted that in some embodiments, a single burst marker map may be selected and/or configured once during system initialization as determined by a standard or a network deployment, while other embodiments may update a burst marker map dynamically, for example, to adapt to network changes.

At step 720, method 700 may select and generate a burst marker sequence (e.g. burst marker sequences 310, 330, or 410) for indicating a data burst. The burst marker sequence may comprise interlaced pilot symbols (e.g. BPSK modulated symbols with values of +1 and −1) and null symbols (e.g. values of zeros). Method 700 may select a burst marker sequence that corresponds to a burst profile (e.g. bit loading profile) for the data burst. For example, a network may employ burst marker sequences with four different interlaced patterns to indicate four different burst profiles, where each interlaced pattern may correspond to one burst profile. The following list examples of four burst marker sequences S1, S2, S3, and S4 with lengths of eight:

Burst marker sequence S1: P, P, N, N, N, N, N, N
Burst marker sequence S2: N, N, P, P, N, N, N, N
Burst marker sequence S3: N, N, N, N, P, P, N, N
Burst marker sequence S4: N, N, N, N, N, N, P, P where P may represent pilot symbols and N may represent null symbols. It should be noted that the length of a burst marker sequence, the number of burst marker sequences, and the interlaced patterns may vary depending on network deployments and/or standard specifications.

At step 730, method 700 may map the burst marker sequence onto OFDM REs according to the selected burst marker map. It should be noted that method 700 may be employed for mapping a burst marker sequence at the beginning of a data burst and/or at the end of a data burst. In addition, some of the steps in method 700 may be re-arranged, combined, and/or skipped. For example, when a network support a single burst profile, method 700 may generate the same burst marker sequence and/or pre-stored the burst marker sequence.

Figure 8:
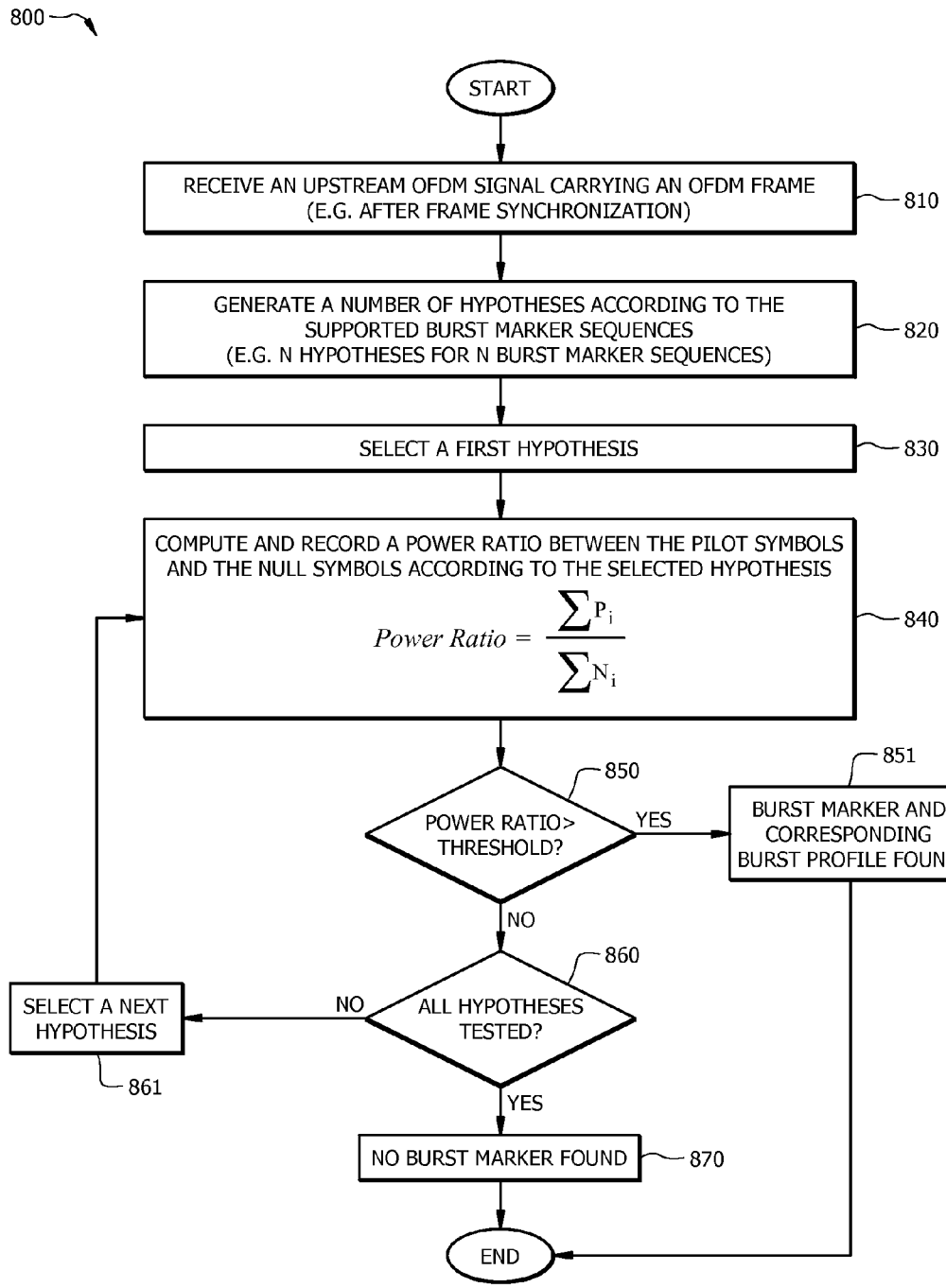
FIG. 8 is a flowchart of an embodiment of a burst marker detection method.

FIG. 8 is a flowchart of an embodiment of a burst marker detection method 800, which may be implemented by a FCU (e.g. FCU 120) in a coaxial network (e.g. portion 152 of network 100) during upstream reception. Method 800 may employ a power based detection scheme for detecting the presence of a burst marker sequence in a received OFDM signal. Method 800 may begin with receiving an upstream OFDM signal carrying an upstream OFDM frame (e.g. after frame synchronization) at step 810. At step 820, method 800 may generate a set of hypotheses for burst marker detection based on a set of burst marker sequences (e.g. interlaced patterns) supported in the network. For example, method 800 may generate N hypotheses for a network that employs N burst marker sequences. Each hypothesis may test the received OFDM signal by assuming the OFDM RE mappings (e.g. time-frequency slot positions) of pilot symbols and null symbols of a particular burst marker sequence (e.g. burst marker sequences 310, 330, or 410). In an embodiment, a network may support four burst profiles and may employ four distinct burst marker sequences S1, S2, S3, and S4 to indicate the four different burst profiles. For example, the four burst marker sequences S1, S2, S3, and S4 may be as shown below:

Burst marker sequence 1 (S1): P, P, N, N, N, N, N, N
Burst marker sequence 2 (S2): N, N, P, P, N, N, N, N
Burst marker sequence 3 (S3): N, N, N, N, P, P, N, N
Burst marker sequence 4 (S4): N, N, N, N, N, N, P, P where P may represent pilot symbols (e.g. values of +1 or −1) and N may represent null symbols (e.g. values of zeros). As such, method 800 may generate four hypotheses H1, H2, H3, and H4, where each hypothesis H1, H2, H3, or H4 may test whether a burst marker sequence S1, S2, S3, or S4 is present in a received OFDM signal, respectively.

At step 830, method 800 may select a first hypothesis from the set of hypotheses. At step 840, method 800 may compute and record a power ratio between pilot symbols and null symbols according to the interlaced pattern of the selected hypothesis as shown below:

$$\text{Power Ratio} = \frac{\sum P_i}{\sum N_i} \quad (1)$$

where i may represent positions (e.g. in time and in frequency) of OFDM REs in the received OFDM frame, $P_i$ may represent received power of the OFDM REs corresponding to pilot symbols in the interlaced pattern, and $N_i$ may represent received power of the OFDM REs corresponding to null symbols in the interlaced pattern.

For example, method 800 may receive an OFDM signal that carries a burst marker sequence S1, where the pilot symbols may comprise a received power of 1.0 (e.g. in some normalized unit) and the null symbols may comprise a received power of 0.01. When method 800 applies hypothesis H1 to test for the burst marker sequence S1, method 800 may compute the power ratio by applying Equation (1) as shown below:

$$\text{Power Ratio } (H1) = \frac{1+1}{0.01+0.01+0.01+0.01+0.01+0.01} = 33.33 \quad (2)$$

When method 800 applies hypothesis H2 to test for the burst marker sequence S2, method 800 may compute the power ratio according to Equation (1) as shown below:

$$\text{Power Ratio } (H2) = \frac{0.01+0.01}{1+1+0.01+0.01+0.01+0.01} = 0.0098 \quad (3)$$

When method 800 applies hypothesis H3 to test for the burst marker sequence S3, method 800 may compute the power ratio according to Equation (1) as shown below:

$$\text{Power Ratio } (H3) = \frac{0.01+0.01}{0.01+0.01+1+1+0.01+0.01} = 0.0098 \quad (4)$$

When method 800 applies hypothesis H4 to test for the burst marker sequence S4, method 800 may compute the power ratio according to Equation (1) as shown below:

$$\text{Power Ratio } (H4) = \frac{0.01 + 0.01}{0.01 + 0.01 + 0.01 + 0.01 + 1 + 1} = 0.0098 \quad (5)$$

As shown above in the four hypotheses H1, H2, H3, and H4, the power ratio may be high when employing a hypothesis (e.g. hypothesis H1) with a correct burst marker sequence. Conversely, the power ratio may be low when employing a hypothesis (e.g. hypotheses H2, H3, or H4) with an incorrect burst marker sequence. Thus, method 800 may determine the presence of a burst marker in the received OFDM signal by comparing the computed power ratio to a pre-determined threshold as shown in step 850. For example, the pre-determined threshold may be selected at a threshold level which may provide a best compromise between a false detection rate (e.g. false detection of an invalid burst marker sequence) and a missed detection rate (e.g. missed detection of a valid burst marker sequence) as determined for the network (e.g. types of channels).

If the computed power ratio exceeds the pre-determined threshold, method 800 may continue to step 851. At step 851, method 800 may determine that a burst marker and a corresponding burst profile are found, where the burst profile is determined by finding a mapping between the burst profile and the burst marker sequence employed in the hypothesis. If the computed power ratio does not exceed the pre-determined threshold, method 800 may proceed to step 860. At step 860, method 800 may determine whether a power ratio comparison test has been performed for all the hypotheses. If there are remaining hypotheses, method 800 may proceed to step 861. At step 861, method 800 may select a next hypothesis and may repeat the loop of steps 840 to 860. If all the hypotheses have been tested and all the hypotheses failed the power ratio comparison at step 850, method 800 may proceed to step 870. At step 870, method 800 may determine that a burst marker sequence is not found in the received OFDM signal.

It should be noted that method 800 may be employed for detecting a starting burst marker sequence (e.g. indicates the start of a data burst) and/or a stopping burst marker sequence (e.g. indicates the end of a data burst). In addition, some of the steps in method 800 may be re-arranged. For example, method 800 may compute power ratios for all of the hypotheses first and then compare the maximum computed power ratio to the pre-determined threshold rather than performing a comparison for each hypothesis. In some embodiments, a new burst marker sequence and/or a new data burst may begin at the beginning of an OFDM resource block. In such embodiments, method 800 may be repeated at the beginning of a next OFDM resource block. It should also be noted that method 800 may be combined with a correlation based detection method.

In an embodiment, a burst marker sequence may be specified via a plurality of burst marker parameters, which may be pre-configured, negotiated, and/or indicated during a network registration. Some examples of burst marker parameters may include a burst marker power boosting parameter, a burst marker inclusion parameter, a burst marker length parameter, and/or a burst marker type parameter. The burst marker power boosting parameter may indicate the amount of transmit power boosting (e.g. in units of dBs) applied to the burst marker sequence with respect to an average transmit power of data. The burst marker inclusion parameter may indicate the number of burst marker sequence transmitted per data burst (e.g. at the beginning and/or at the end of each data burst). The burst marker length parameter may indicate the number of burst marker symbols (e.g. a total number of pilot symbols and null symbols) in a burst marker sequence. The burst marker type parameter may indicate the type of burst marker sequences (e.g. binary sequences 510, 520, 530, and 540 or ternary sequences 610, 620, 630, and 640) when more than one type of burst marker sequences are employed in a network.

Figure 9:
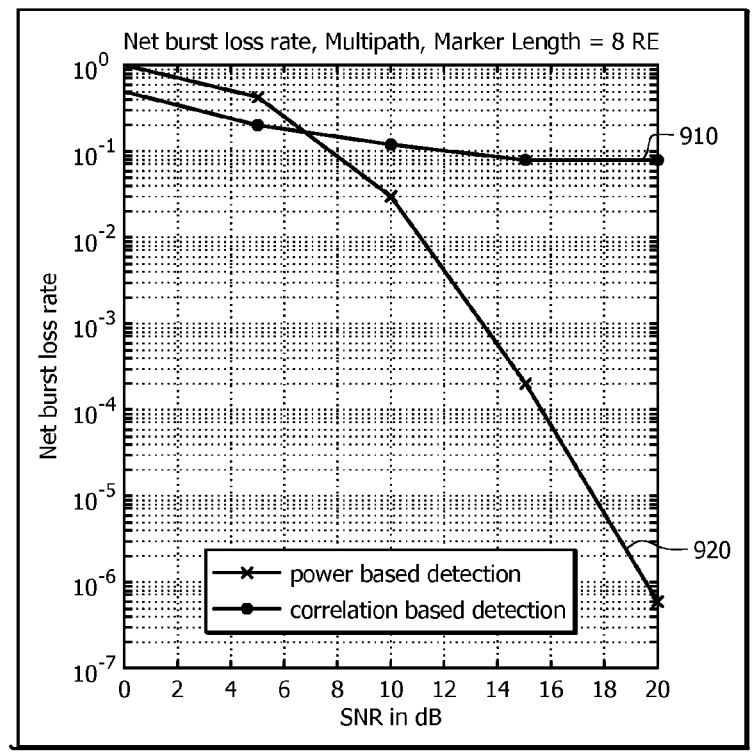
FIG. 9 is a graph of an embodiment of simulated net burst loss rate versus Signal-to-Noise Ratios (SNR) curves.

FIG. 9 illustrates a graph 900 of an embodiment of simulated net burst loss rate versus SNR curves. The x-axis may represent SNR in units of dBs and the y-axis may represent net burst loss rate. The simulation may be configured for Additive White Gaussian Noise (AWGN) channel with a DOCSIS multipath profile (e.g. cover 97 percent (%) of DOCSIS channels), which may include path delays at $[0.5, 1, 1.5, 2, 3, 4.5] \times 1e^{-6}$ seconds with corresponding powers of [−16, −22, −29, −35, −42, −51] dB. In addition, the simulation may include a carrier frequency offset of 25 Hertz (Hz) (e.g. residual after synchronization). The simulation may comprise data bursts with four different burst profiles, where each burst profile may be indicated by a burst marker sequence with lengths of eight burst marker symbols (e.g. carried in eight OFDM REs). In graph 900, curve 910 may represent the net burst loss rate versus SNR when employing a correlation based burst marker detection method (e.g. computing a correlation between the received signal and a known burst marker sequence). Curve 920 may represent the net burst loss rate versus SNR when employing a power based burst marker detection method (e.g. method 800). As can be observed from curves 910 and 920, the net burst loss rate may be improved significantly with the power based burst marker detection method at high SNRs (e.g. higher than 7 dB). Since EPoC networks (e.g. network 100) may operate at an average SNR of 30 dB or higher, a power based burst marker detection method may provide significant improvement in net burst loss rate. It should be noted that a net burst loss rate may include a miss detection rate (e.g. when missing a valid burst) and a false detection rate (e.g. when detecting an invalid burst).

Figure 10:
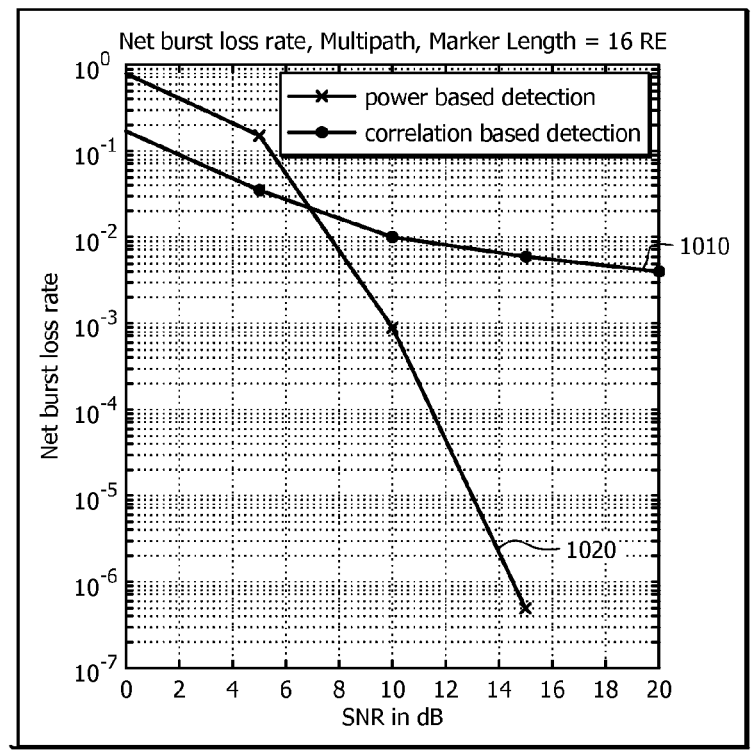
FIG. 10 is a graph of another embodiment of simulated net burst loss rate versus SNR curves.

FIG. 10 illustrates a graph 1000 of another embodiment of simulated net burst loss rate versus SNR curves. The x-axis may represent SNR in units of dBs and the y-axis may represent net burst loss rate. Graph 1000 may be generated by configuring a simulation with substantially similar channel conditions and system parameters (e.g. AWGN channel, multipath profile, carrier frequency offset) as in graph 900. However, the simulation that generated graph 1000 may configure each burst marker sequence with sixteen burst marker symbols (e.g. carried in sixteen OFDM REs) instead of eight burst marker symbols. In graph 1000, curve 1010 may represent the net burst loss rate versus SNR when employing a correlation based burst marker detection method (e.g. computing a correlation between the received signal and a known burst marker sequence). Curve 1020 may represent the net burst loss rate versus SNR when employing a power based burst marker detection method (e.g. method 800). As can be observed from curves 1010 and 1020, curves 1010 and curves 1020 may comprise substantially similar trends as curves 910 and 920, respectively, where the net burst loss rate is improved significantly with the power based burst marker detection method at high SNRs (e.g. higher than 7 dB). In addition, further performance improvement (e.g. by about four dB to about five dB at 10e$^{-5}$ net burst loss rate) may be observed with a longer burst marker sequence (e.g. comparing curves 920 to 1020).

In an embodiment, an EPoC network as defined in IEEE document 802.3bn, which is incorporated herein by reference, may employ burst markers to indicate the beginning of a data burst and/or an end of a data burst. In addition, burst markers may indicate bit loading profiles of data bursts. A burst marker may comprise a predefined sequence of elements called burst marker elements. There may be three types of burst marker elements, ones, negative ones, and/or zeros, where ones and negative ones may represent BPSK modulated symbols, and zeros may represent nulls (e.g. no energy being transmitted). A burst marker sequence may be defined either using any two or all three types of elements. Each burst marker element may be transmitted in one resource element, where a resource element may represent one OFDM sub-carrier of an OFDM symbol. For burst marker elements of zeros, the resource element may not transmit any signal (e.g. zero energy). There may be N unique burst marker sequences, one for each of the N bit loading profiles.

In an embodiment, the power of a burst marker sequence may be boosted with respect to the average power of data. For example, a parameter marker_power may be set to a value of zero, one, or two to indicate that the average transmit power of the burst marker is zero, three, or six dB higher than the average transmit power of the data, respectively.

In an embodiment, a parameter marker_incl may determine the number of burst markers transmitted with each burst. If the parameter marker_incl is set to a value of zero, then the transmitter may not use burst marker. If the parameter marker_incl is set to a value of one, then the transmitter may use a burst marker at the beginning of each burst. If the parameter marker_incl is set to a value of two, then the transmitter may use a burst marker at the end of each burst. If the parameter marker_incl is set to a value of three, then the transmitter may use the same burst marker twice per burst, one at the beginning of the burst and another one at the end of the burst. Alternatively, the transmitter may use different burst markers to indicate the beginning of a burst and the end of the burst. The parameter marker_incl may be set to a value of zero when there is one and only one profile in use in the EPoC network.

In an embodiment, the length of a burst marker sequence may be the number of burst marker elements in the sequence. The length of the burst marker sequence may be configurable, for example, to a value of 16, 24, 32, 40, 48, 56, and/or 64. The parameter marker_length may specify the length, L, of a burst marker sequence. The values of zero, one, two, three, four, five, and/or six may correspond to lengths L of 16, 24, 32, 40, 48, 56, and/or 64, respectively.

In an embodiment, a burst marker may be mapped row wise across a time axis and from top to bottom across frequency (e.g. the sub-carrier axis). Interleaving burst marker sequence and/or pilots may spread the burst marker sequence across more sub-carriers. This may provide immunity for the burst marker sequence against narrow band ingress. For example, a burst marker scheme that is substantially similar to the burst marker scheme 400 described herein above may map the first, third, fifth, etc. resource elements with a burst marker sequence and may map the second, fourth, sixth, etc. resource elements with data and/or pilots, where the first resource element may correspond to the beginning of a first resource block of a burst.

In an embodiment, a burst marker sequence may be generated from a Gold Sequence generator. $Z^7+Z^3+1$ may be employed as the generator polynomial for the first polynomial and $Z^7+Z^3+Z^2+Z+1$ may be employed as the generator polynomial for the second polynomial. The first polynomial may be referred to as a first preferred polynomial in a gold sequence generator. The second polynomial may be referred to as a second preferred polynomial in a gold sequence generator. However, the first and/or the second polynomials may be alternatively configured as determined by a person of ordinary skill in the art to achieve the same functionalities. The initial condition for the first PN sequence generator may be set to [0 0 0 0 0 0 1]. The initial condition for the second PN sequence generator may set to [0 0 0 0 0 0 1]. Using the above generator polynomials, initial conditions, and gold sequence generator indices of five, six, seven, and eight, four distinct burst marker sequences may be generated for profile one, profile two, profile three, and profile four, respectively. For example, the four profiles may correspond to four binary burst marker sequences (e.g. as shown in table 500) or four ternary burst marker sequences (e.g. as shown in table 600). A parameter marker_type may be used to indicate the type of burst marker sequences. For example, if the parameter marker_type is set to a value of one, then the transmitter may use the binary burst marker sequences as defined in table 500. If the parameter marker_type is set to a value of zero, then the transmitter may use the ternary burst marker sequences as defined in table 600. If the specified marker length, L is less than 64, then the transmitter may select the first L entries (e.g. starting from the top) of the burst marker sequences defined in table 500 or 600.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means ±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a receiver configured to:
couple to an Ethernet Passive Optical network over Coaxial (EPoC) network; and
receive an upstream Orthogonal Frequency Division Multiplexing (OFDM) signal comprising a plurality of OFDM Resource Elements (REs); and
a processor coupled to the receiver and configured to:
determine a presence of a burst marker sequence in the received signal, wherein the burst marker sequence comprises interlaced pilot symbols and null symbols, and wherein determining the presence of the burst marker sequence comprises:
computing a power ratio between a first set of the OFDM REs and a second set of the OFDM REs; and
determining that the burst marker sequence is found when the computed power ratio exceeds a pre-determined threshold,
wherein each OFDM RE corresponds to a time-frequency slot that comprises a frequency interval of one OFDM sub-carrier and a time interval of one OFDM symbol, wherein the pilot symbols comprise non-zero transmission energy symbols, and wherein the null symbols comprise zero transmission energy symbols, and
wherein the burst marker sequence comprises a pre-determined interlaced pattern between the pilot symbols and the null symbols, wherein the first set of OFDM REs correspond to time-frequency slot positions of the pilot symbols, wherein the second set of OFDM REs correspond to time-frequency slot positions of the null symbols, and wherein computing the power ratio comprises:
computing a first total received power for the first set of OFDM REs;
computing a second total received power for the second set of OFDM REs; and
computing a ratio between the first total received power and the second total received power.

2. The apparatus of claim 1, wherein the processor is further configured to determine a burst profile for a data burst indicated by the burst marker sequence, and wherein determining the burst profile comprises finding a mapping between the pre-determined interlaced pattern and a corresponding burst profile.

3. The apparatus of claim 1, wherein the presence of the burst marker sequence indicates a beginning of data.

4. The apparatus of claim 1, wherein the presence of the burst marker sequence indicates an end of data.

5. The apparatus of claim 1, wherein the burst marker sequence spans across a plurality of contiguous OFDM REs in time, and wherein the plurality of contiguous OFDM REs comprise one or more sub-carrier frequencies.

6. The apparatus of claim 1, wherein the burst marker sequence spans across a plurality of alternating OFDM REs in time and in contiguous sub-carrier frequencies.

7. An apparatus comprising:
a processor configured to generate a burst marker sequence comprising a plurality of pilot symbols and a plurality of null symbols, wherein the plurality of pilot symbols and the plurality of null symbols are mapped onto a plurality of Orthogonal Frequency Division Multiplexing (OFDM) Resource Elements (REs) according to a pre-determined pattern, wherein the burst marker sequence pilot symbols comprise Binary Phase Shift Keying (BPSK) modulated symbols generated by applying an exclusive-or (XOR) operator to a polynomial sequence; and
a transmitter coupled to the processor and configured to:
couple to an Ethernet Passive Optical network over Coaxial (EPoC) network; and
transmit the burst marker sequence to indicate an upstream data burst boundary to a receiver across the EPoC network,
wherein the upstream data burst boundary is determined by the receiver by computing a power ratio between pilot symbol carrying OFDM REs and null symbol carrying OFDM REs according to the pre-determined pattern.

8. The apparatus of claim 7, wherein each OFDM RE corresponds to a time-frequency slot that comprises a frequency interval of one OFDM sub-carrier and a time interval of one OFDM symbol, wherein the null symbols comprise zero transmission energy, wherein each pilot symbol is transmitted in one OFDM RE, and wherein each null symbol is transmitted in one OFDM RE.

9. The apparatus of claim 7, wherein the boundary comprises a beginning of data, an end of the data, or combinations thereof.

10. The apparatus of claim 7, wherein the burst marker sequence is transmitted at a beginning frequency of an OFDM resource block, and wherein the OFDM resource block comprises a pre-determined number of contiguous OFDM REs that span across a pre-determined time interval and a pre-determined frequency interval.

11. The apparatus of claim 7, wherein the burst marker sequence indicates the presence of a data burst, and wherein the processor is further configured to select the burst marker sequence according to a burst profile associated with the data burst.

12. A method comprising:
   generating a burst marker sequence comprising a plurality of burst marker elements;
   mapping each burst marker element onto one Orthogonal Frequency Division Multiplexing (OFDM) Resource Element (RE), wherein the burst marker sequence is mapped across a time domain and across a frequency domain; and
   transmitting the burst marker sequence to indicate a data burst to a receiver across an Ethernet Passive Optical network over Coaxial (EPoC) network,
   wherein the burst marker sequence comprises Binary Phase Shift Keying (BPSK) modulated symbols generated by applying an exclusive-or (XOR) operator to a polynomial sequence, and
   wherein an upstream data burst boundary is determined by the receiver by computing a power ratio between pilot symbol carrying OFDM REs and null symbol carrying OFDM REs according to a predetermined pattern.

13. The method of claim 12 further comprising interlacing the burst marker sequence with data symbols, pilot symbols, or combinations thereof.

14. The method of claim 13 further comprising transmitting a message comprising a burst marker inclusion parameter that indicates a number of burst marker sequences transmitted with each data burst.

15. The method of claim 13 further comprising transmitting a message comprising a length of the burst marker sequence, wherein the length indicates a number of the burst marker elements in the burst marker sequence.

16. The method of claim 13, wherein the burst marker sequence is generated from a gold sequence generator that comprises a first pseudo noise (PN) generator with a polynomial of $Z^7+Z^3+1$ and a second PN generator with a polynomial of $Z^7+Z^3+Z^2+Z+1$.

17. The method of claim 12, wherein the burst marker elements comprise values of ones, negative ones, and zeroes.

18. The method of claim 12 further comprising transmitting a message comprising a power boosting parameter that indicates an amount of power boosting for the burst marker sequence with respect to an average transmit power of data.

19. A method comprising:
   receiving, via a receiver, an upstream Orthogonal Frequency Division Multiplexing (OFDM) signal comprising a plurality of OFDM Resource Elements (REs) via an Ethernet Passive Optical network over Coaxial (EPoC) network;
   determining, via a processor, a presence of a burst marker sequence in the received signal, wherein the burst marker sequence comprises interlaced pilot symbols and null symbols, and wherein determining the presence of the burst marker sequence comprises:
      selecting at least one burst marker profile for the burst marker sequence;
      computing a power ratio between a set of expected pilot OFDM REs and a set of expected null OFDM REs selected according to the burst marker profile, wherein computing the power ratio comprises summing the expected pilot OFDM REs as a numerator of the power ratio and summing the expected null OFDM REs as a denominator of the power ratio; and
      determining that the burst marker sequence is found when the computed power ratio exceeds a predetermined threshold.

20. The method of claim 19, wherein determining the presence of the burst marker sequence further comprises iteratively selecting burst marker profiles for power ratio computation until the burst marker sequence is found.

21. The method of claim 19, wherein the pilot symbols comprise values of −1 and +1, and wherein the null symbols comprise values of 0.

* * * * *